C. JASS.
COVERING ROLLER.
APPLICATION FILED MAR. 13, 1911.
995,871.
Patented June 20, 1911.
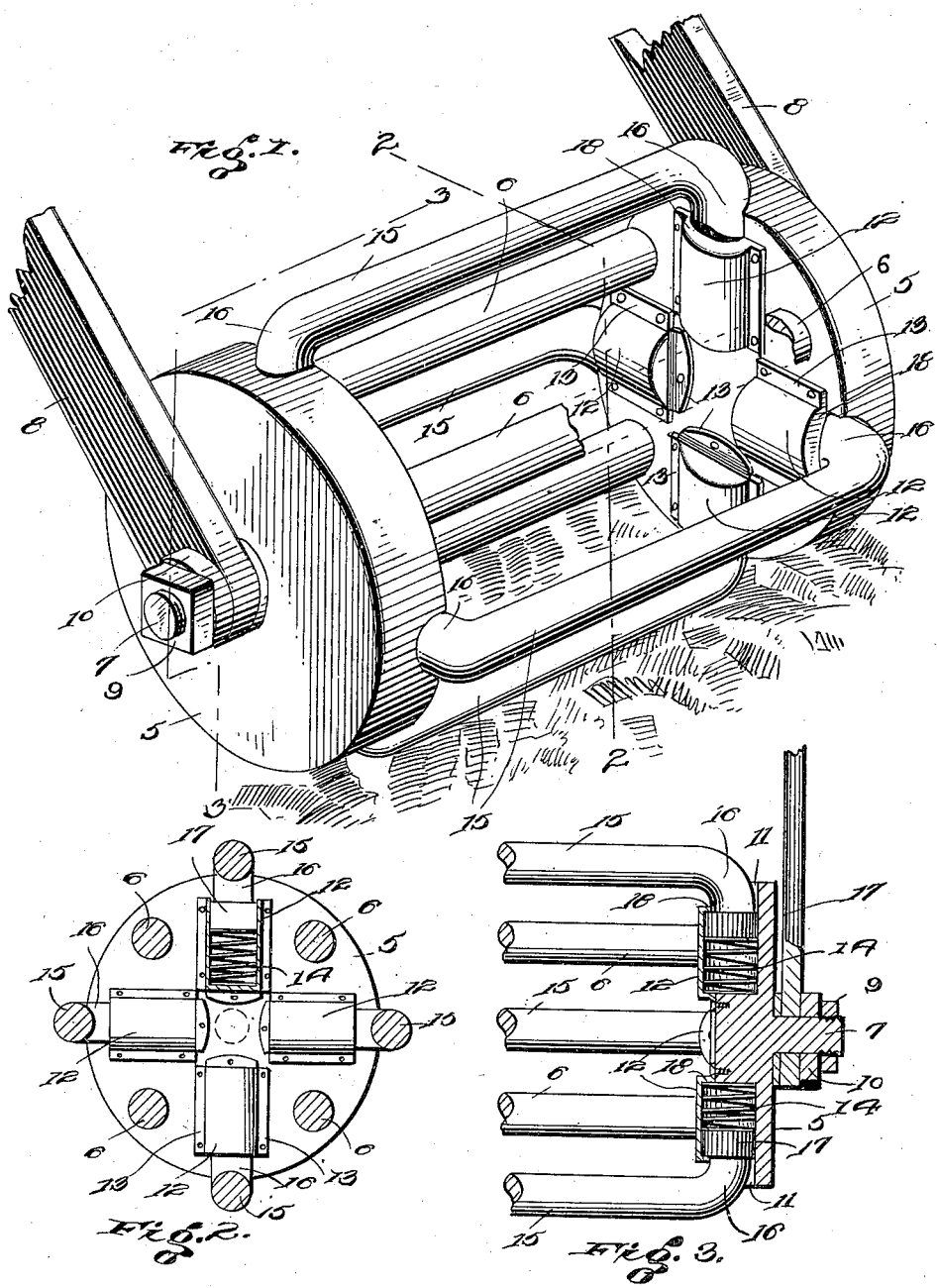
WITNESSES
INVENTOR
Carl Jass.
By E. E. Vrooman,
his Attorney.

UNITED STATES PATENT OFFICE.

CARL JASS, OF HORICON, WISCONSIN.

COVERING-ROLLER.

995,871.    Specification of Letters Patent.    Patented June 20, 1911.

Application filed March 13, 1911. Serial No. 614,060.

*To all whom it may concern:*

Be it known that I, CARL JASS, a citizen of the United States, residing at Horicon, in the county of Dodge and State of Wisconsin, have invented certain new and useful Improvements in Covering-Rollers, of which the following is a specification, reference being had therein to the accompanying drawing.

This invention relates to covering rollers for use in connection with planters, and the principal object of the same is to provide a covering roller that can be pivotally connected to the rear of a planter and which will yieldably act upon the soil to cover the seed but not pack the earth over the same.

A preferred and practical embodiment of a covering roller constructed in accordance with this invention is shown on the accompanying sheet of drawings wherein:—

Figure 1 is a perspective view of the improved covering roller. Fig. 2 is a transverse vertical sectional view taken on the line 2—2, Fig. 1. Fig. 3 is a fragmentary vertical longitudinal sectional view taken on the line 3—3, Fig. 1.

Referring to the accompanying drawings by numerals it will be seen that the improved roller is composed of a pair of disks 5 which are connected in spaced relation by the bars 6, each disk being provided with a centrally located laterally projecting stub axle 7 upon which the arms 8 are pivotally mounted for connecting the roller to the rear of a planter. The stub axles 7 are threaded for the reception of nuts 9 for retaining the collars 10 in contact with the arms 8.

The inner surfaces of the disks 5 are provided with radial grooves 11 that extend to the peripheries of said disks, and said grooves are spanned by the bowed plates 12 which have their flanges 13 suitably fastened to said inner surfaces. This arrangement of grooves and plates provides radial pockets in which springs 14 are seated. Peripheral bars 15 have right-angularly projecting ends 16 that are slidable in the pockets, said ends being equipped with flanges 17 which are seated on the upper ends of the springs 14. The upper edges of plates 12 are inturned to provide abutment flanges 18 which prevent the ends 16 of the bars 15 being displaced from the pockets.

In use, the arms 8 are pivotally connected to the rear of a planter so that the roller will trail behind the same, and be permitted to swing relative to the planter to prevent damage being done while traveling over rough ground. It will be seen that the bars 15 being yieldably connected to the disk 5, they will loosely pile the soil over the seed, and in the event of the roller swinging vertically relative to the planter, they will not pack the soil when they return for the reason that said bars being in spaced relation, there is never more than one of the bars in contact with the soil.

What I claim as my invention is:—

1. A covering roller comprising end disks, means for connecting said disks in spaced relation, said disks being provided with radial pockets, springs in said pockets, covering bars having their ends in said pockets and resting on said springs, and means for pivotally connecting said disks to a planter.

2. A covering roller comprising a pair of disks, provided with radial pockets, means for connecting said disks in spaced relation, covering bars having their ends mounted in said pockets, and means for pivotally connecting said disks to a planter.

3. A covering roller comprising a pair of disks provided with radial pockets, springs in said pockets, and covering rollers having their ends slidable in said pockets and seated on said springs.

4. A covering roller comprising a pair of disks provided with radial grooves in their inner surfaces, said grooves extending to the peripheries of said disks, bowed plates spanning said grooves to provide pockets, springs seated in said pockets, means for connecting said disks in spaced relation, covering bars having angular ends slidable in said pockets, said ends being provided with flanges that rest on the springs, said plates being provided with abutment flanges for limiting the outward movements of the angular ends, and means for connecting the disks to a planter.

In testimony whereof I hereunto affix my signature in presence of two witnesses.

CARL JASS.

Witnesses:
EDWARD C. DAWE,
AHYMAN P. BOUTON.

Copies of this patent may be obtained for five cents each, by addressing the "Commissioner of Patents, Washington, D. C."